United States Patent

[11] 3,586,198

| [72] | Inventor | Terry O. Hockenberry<br>Pittsburgh, Pa. |
|---|---|---|
| [21] | Appl. No. | 821,641 |
| [22] | Filed | May 5, 1969 |
| [45] | Patented | June 22, 1971 |
| [73] | Assignees | Dr. Everard M. Williams<br>Pittsburgh, Pa.;<br>Dr. Terry O. Hockenberry<br>Fox Chapel, Pa., part interest to each |

[54] OSCILLOSCOPE DISPLAY FOR ELECTRIC DISCHARGE MACHINING APPARATUS AND THE LIKE
13 Claims, 10 Drawing Figs.

| [52] | U.S. Cl. | 216/69, 219/109 |
|---|---|---|
| [51] | Int. Cl. | B23k 9/16 |
| [50] | Field of Search | 219/69, 69 C, 69 M, 109 |

[56] References Cited
UNITED STATES PATENTS

| 2,616,014 | 10/1952 | Ellerby | 219/109 |
| 3,504,154 | 3/1970 | Marcolini | 219/69 C |

*Primary Examiner*—J. V. Truhe
*Assistant Examiner*—Hugh D. Jaeger
*Attorney*—Buell, Blenko and Ziesenheim

ABSTRACT: Gap discharge apparatus comprises an electrode tool and workpiece spaced to form a discharge gap therebetween. A circuit connects a source of unidirectional potential and pulse generating means for generating a series of pulses at given repetition rate, in series to the tool and workpiece for inducing repetitive discharges across the gap. An oscilloscope, with angularly disposed deflecting means, has one of its deflecting means coupled to the tool and workpiece in electrical parallel with the discharge gap, and another of its deflecting means in series with the source and the tool or workpiece and the discharge gap.

INVENTOR
Terry O. Hockenberry
ATTORNEYS

INVENTOR
Terry O. Hockenberry

ATTORNEYS

INVENTOR
Terry O. Hockenberry

ATTORNEYS

INVENTOR
Terry O. Hockenberry

ATTORNEYS

OSCILLOSCOPE DISPLAY FOR ELECTRIC DISCHARGE MACHINING APPARATUS AND THE LIKE

The present invention relates to oscilloscope displays for electric discharge machining (EDM) apparatus and the like, and more particularly to oscilloscope displays of the character described wherein gap voltage is plotted against machining current. In one arrangement of my invention a normalizing arrangement is employed for the displays.

Oscilloscope displays have heretofore been incorporated in the power supplies of EDM apparatus. In such displays the EDM gap voltage invariably has been presented as a function of time. Typical of such displays is U.S. Pat. No. 3,504,154 to V. H. Marcolini. The information concerning machining conditions thus obtained is undeniably valuable to a circuit designer or other highly trained observer.

To the untrained or semiskilled observer, however, such as the usual operator of EDM apparatus, the gap voltage versus time function conveys very little immediately useful information regarding the machining process. From conventional oscilloscope displays the usual operator can perceive only that the EDM gap is in one of three conditions: open circuit, short circuit, or machining. These conditions can be readily conveyed to the operator by other means, such as direct observation or use of conventional meters. The untrained observer is unable to evaluate a conventional oscilloscope display to determine whether the machining procedure is progressing efficiently or inefficiently. During the actual machining operation, the conventional oscilloscope display shows what is best described as "grass" on the screen. The characteristic differences among these displays as associated with differing machining operations are subtle and difficult to interpret.

I overcome these disadvantages of present practices, by providing an oscilloscope display for EDM apparatus in which the gap voltage is plotted as a function of machining current. I have discovered that an oscilloscope of this nature results in widely varying, and more or less static patterns which can be interpreted readily by the usual EDM operator. Moreover, the several patterns can be distinguished readily by the operator as denoting certain aspects of good, bad or deteriorating machining conditions. Accordingly, the operator can make the required corrections or adjustments in the EDM apparatus, in many cases in advance of deteriorated machining conditions to assure continuation of a proper machining operation. With my apparatus the onset of a deteriorating condition becomes immediately apparent from the oscilloscope so that corrective action can be taken to restore optimum machining conditions, before the machining operation deteriorates to any great extent. Thus, declining rates of material removal and workpiece damage can be avoided, the beginnings of which are not always apparent by direct observation. My display apparatus is an adjunct to more or less conventional means for controlling EDM apparatus and these controls can be used instead of or in connection with the oscilloscope display, if so desired. Thus, a given operator is not compelled to use the oscilloscope display when so provided, on a given EDM apparatus.

My novel display apparatus shows exactly the conditions of the EDM or discharge gap at any given instant. When so employed a relatively untrained or semiskilled operator can readily perceive or derive activistic information from the display, which is otherwise exceedingly difficult to determine and to evaluate. For example, the operator can ascertain the existence of the initial stages of an improper flushing condition between the electrode tool and the workpiece, the commencement of intermittent short circuits, or the imminence of an arcing or "coking" condition, none of which can be determined readily by existing apparatus. My apparatus is particularly advantageous in that it allows correction of the machining process to remove conditions resulting in slight deterioration of the machining operation, which otherwise would never be noticed or detected by even a highly skilled operator.

Where the EDM apparatus or the like is provided with means for selecting one of several available machining rates or machining current levels, I also provide means for "normalizing" the oscilloscope display. With this arrangement, the configuration of the oscilloscope display for a given machining condition, does not change substantially as the apparatus is switched from a low machining current level through intervening levels to a high machining current level. In consequence, a semiskilled operator does not have to compensate for normal changes in the display which would otherwise inherently occur when the machining current level is changed.

I overcome the aforementioned disadvantages of the prior art and accomplish these desirable results by providing gap discharge apparatus comprising an electrode tool and workpiece spaced to form a discharge gap therebetween, a source of unidirectional potential, pulse generating means for generating a series of pulses, at given repetition rate, means for connecting said source and said pulse-generating means in series to said tool and said workpiece for inducing repetitive discharges across said gap, an oscilloscope having angularly disposed first and second deflecting means, said first deflecting means being connected to said tool and said workpiece in electrical parallel with said gap, and circuit means for coupling said second deflecting means in series with said source and one of said tool and said workpiece and in series with said gap.

I also desirably provide similar gap discharge apparatus wherein a current level circuit is coupled between said source and one of said tool and said workpiece for establishing a plurality of machining current levels across said gap when said gap discharges occur, and normalizing circuit means are coupled between said second deflecting means and said coupling circuit means for normalizing the signal applied to said second deflecting means irrespective of machining current level.

I also desirably provide similar gap discharge apparatus wherein said normalizing circuit means include a like plurality of impedance paths, said impedance paths being stepped in inverse ratio to said machining current levels.

I also desirably provide similar gap discharge apparatus wherein manual selector switch means are coupled to said current level circuit for selecting one of said machining current levels, and additional manual switch means are coupled to the impedance paths of said normalizing circuit means for selecting one of said paths in conformance to a selected one of said machining current levels.

I also desirably provide similar gap discharge apparatus wherein said first-mentioned manual switch means and said additional switch means are mechanically coupled together for simultaneous actuation thereof.

I also desirably provide similar gap discharge apparatus wherein said coupling circuit means include a low impedance current shunt, and said second deflecting means are coupled across said shunt for developing a deflecting signal for said second deflecting means.

I also desirably provide similar gap discharge apparatus wherein amplifying means are coupled between said second deflecting means and said current shunt.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein.

Figure 1:
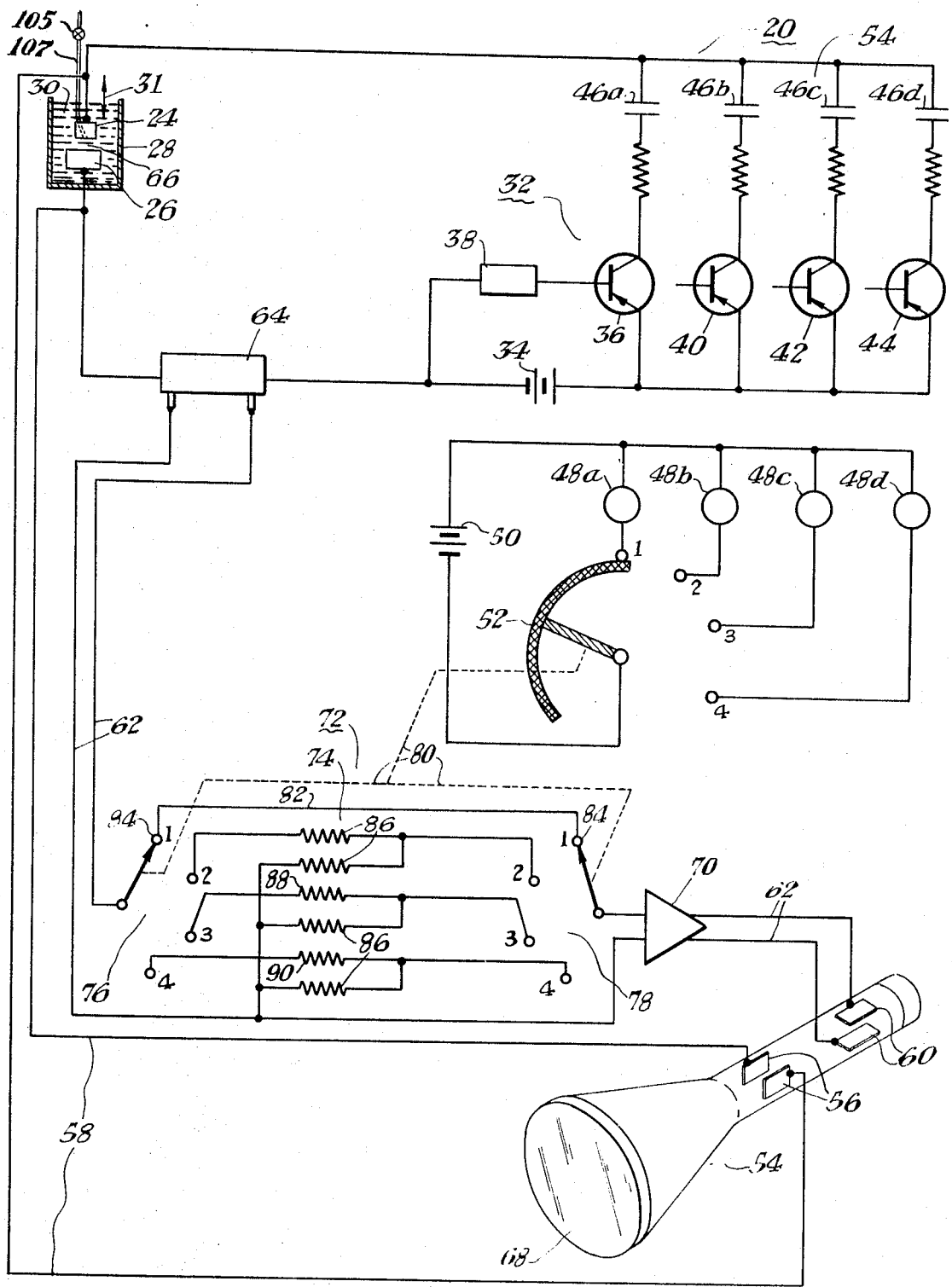
FIG. 1 is a schematic circuit diagram of an exemplary EDM apparatus provided with my oscilloscope display arrangement.

Referring initially to FIG. 1 of the drawings, EDM apparatus 20 is provided with an oscilloscope display arrangement denoted generally by the reference character 22. The EDM apparatus 20 typically includes an electrode tool 24 and a workpiece 26 which are supported by suitable and known means (not shown) within a container 28 and a bath 30 of a dielectric fluid such as kerosene. Suitable electrode positioning means (not shown) for the tool 24 likewise desirably are provided for advancing and withdrawing the tool (arrow 31) relative to the workpiece 26. Repetitive gap discharges are established between tool 24 and workpiece 26 by a suitable power supply 32 including in this example a source of unidirectional potential 34 and one or more parallel connected switching transistors, for example switching transistor 36. The base of the transistor 36 is biased through pulsing generating network 38 and the transistor 36 and network 38 constitute one form of pulse-generating means for the discharge gap. The network 38, which can comprise a pulse generator known as "Unit Pulse Generator Type 1217B" available from General Radio, Concord, Mass., is capable of rapidly turning the transistor 36 on and off to define the aforementioned repetitive gap discharge. The frequency and on time of the network 38 can be adjusted.

The power transistors 40, 42, 44 are similarly biased by connection to the network 38 and provide parallel current paths between the source 34 and the electrode tool 24. Pairs of relay contacts 46a—46d are coupled respectively in the branch circuits containing the transistors 36—44 so that one or more of the power transistors 36—44 can be coupled into the supply circuit 32 to adjust the machining current level.

The relay contacts 46a—46d are respectively opened and closed by corresponding relay coils 48a—48d, which are capable of being energized from source 50 by operation of rotary switch 52. The rotary switch 52 is of known construction, and in this example is arranged so that successive branches containing the transistors 40, 42, 44 can be progressively added or subtracted to the current level circuit 54 to select differing machining current levels. Higher machining current levels of course, are attained by progressively adding power transistors 40, 42, 44 respectively to the current level circuit by bridging related ones of the contacts of the rotary switch 52.

In the aforedescribed EDM apparatus, the gap voltage level remains substantially constant irrespective of the machining current level which may be selected. The more or less unvarying gap voltage level is not only advantageous to the EDM operation but also facilitates the provision of an acceptable and readily interpretable oscilloscope display.

In accordance with one feature of my invention, I provide an oscilloscopic display apparatus 22 having a conventional oscilloscope or cathode-ray tube 54. First deflecting means for example horizontal plates 56, are connected through conductors 58 to the electrode tool 24 and workpiece 26. Thus, the gap voltage of the EDM apparatus 20 is applied to the horizontal plates 56. On the other hand I connect second deflecting means for example vertical plates 60, through conductors 62 to coupling circuit means such as a very low inductance current shunt (in this example a low resistance plate 64) connected in series with source 34 and one of the tool and workpiece 24, 26. In the illustrated example I use a plate 64 of stainless steel or manganin or the like having about ten times the resistivity of copper. The use of the plate 64 virtually eliminates inductive impedance and avoids spurious signals on conductors 62 at the higher discharge rates. In this example the plate has an IR drop of about 0.1 volt at about 100 amps. Thus, a signal proportional to the current flowing across machining gap 66 is applied to the vertical deflecting plates 60 of the cathode-ray tube.

With the arrangement thus far described, an oscillograph of gap voltage versus machining current appears on screen 68 of the cathode-ray tube 54, when the EDM apparatus 20 is operated. It will be understood that a suitable and known power supply (not shown) is provided for the cathode-ray tube 54 for biasing functions and for energizing its electron gun.

The displays visible upon the screen 68 for various machining gap conditions can be readily differentiated as described below. These differences are made even more apparent by the use of a fixed gain, DC to high frequency (30mc.) amplifier 70 is coupled between the vertical deflecting plates 60 and the current shunt 64. The use of the amplifier 70, which is available from Tektronix (Type K plug-in unit), Beaverton, Ore., provides oscilloscope displays which approximate the displays shown in FIGS. 2—10 of the drawings for the various EDM gap conditions.

The circuit, as thus far described functions admirably for a given machining current level. Moreover, the basic changes in the oscilloscope display, which are indicative of the various machining conditions or deteriorations can be readily ascertained by an adequately experienced operator of the EDM apparatus 20 as he switches from one machining current level to another. However, a semiskilled operator or a relatively new operator may find the vertical extension of the oscilloscope display somewhat confusing as the power supply is switched to progressively higher machining current levels by operation of the rotary switch 52.

Accordingly, I provide means for compensating the oscilloscope display circuit i.e. for "normalizing" the oscilloscope display circuit on screen 68, as the differing machining current levels are selected. Such normalizing means operate to maintain the height, in this example of the oscilloscope display essentially constant for a given machining gap condition, regardless of the particular machining current level selected. One form of such normalizing circuit means 72 includes a voltage dividing circuit 74 which is coupled to the vertical plate conductors 62 by a pair of rotary switches 76, 78 or the like. Desirably the rotary switches 76, 78 are ganged or otherwise mechanically coupled to the rotary switch 52 forming part of the machining current level circuit 54 of the EDM apparatus 20, as denoted by dashed lines 80. Thus, the normalizing circuit 72 can be actuated automatically for each machining current level as selected. Alternatively, the mechanical connection 80 can be omitted and the rotary switches 76, 78 can be actuated manually and separately of the selector switch 52.

In this arrangement the oscilloscope display on screen 68 is "normalized" to the lowest machining current level as represented by selection of a single one of the power transistors 36—44, in this example the transistor 36. Thus, a minimal impedance path, represented by conductor segment 82 is established between contacts 84 of switches 76, 78. On the other hand, the voltage dividing network 74 is arranged such that the signal applied to the vertical plates 60 is halved, reduced to one-third and then to one-fourth as the power transistors 40, 42, 44 are progressively added to the circuit. Thus, as the gap machining current is correspondingly increased, assuming that the power transistors 36—40 are substantially identical, the basic signal level that is applied to the vertical deflecting plates 60 remains substantially constant as the switches 52, 76, 78 are simultaneously manipulated in conformance with their respective contact positions.

For the particular voltage dividing network 74, shown in FIG. 1 and again assuming that the power transistors 36, 44 are similar, resistances 86 are substantially equal in value while resistances 88 and 90 are two and three times, respectively, the value of the resistances 86. It will be understood that additional similar power transistors can be added or subtracted from the machining circuit 54 and additional stepped branches can be added to or subtracted from the voltage dividing circuit 74, within the framework established by the illustrative circuits 54 and 74. On the other hand it will be apparent that transistors and resistors of other correspondingly related values can be substituted in the current level circuit 54 and in the voltage-dividing circuit 74. Likewise other current level paths can be substituted for the circuit 54, and other impedance paths can be substituted for the voltage-dividing circuit 74.

With the use of the normalizing circuit means 72, the oscilloscope displays appearing on the screen 68 will be substantially identical for a substantially identical gap condition, irrespective of the machining current level, providing that the normalizing circuit 72 is switched in consonance with the machining current selector switch 52. This follows from the fact that the current level signal applied to the vertical plate 60 does not change, when my novel normalizing means are employed. As noted above, the oscilloscope displays are normalized to the lowest machining current level through the use of the minimal impedance path or conductor segment 82. It will be understood that the oscilloscope displays can be normalized to a higher machining current level for example by substituting a minimal impedance path between the corresponding contacts of switches 76, 78 and by substituting gain circuit means for one or more impedance paths corresponding to the lower current level or levels.

The arrangement shown in FIG. 1, moreover, assures that the display will not be extended off the screen 68, when the higher machining current levels are used.

Figure 2:
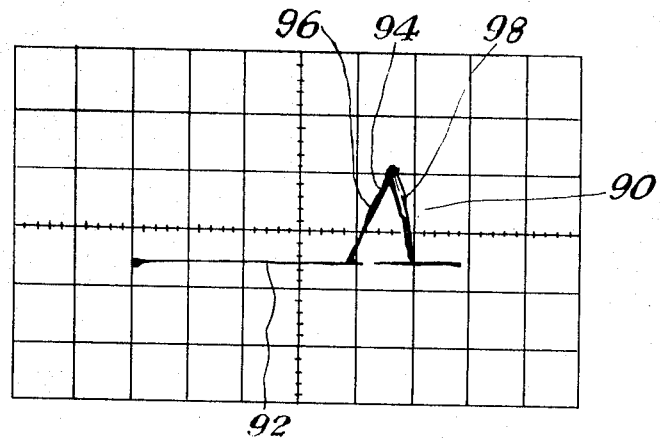
FIG. 2 shows an oscilloscope display of a normal machining operation, in which gap voltage is plotted against machining current in accordance with my invention.
Figure 3:
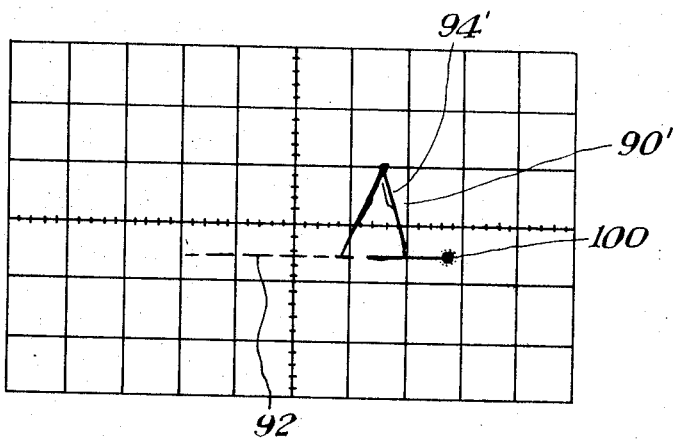
FIG. 3 is a similar display provided by a machining operation having intermittent short circuits.

Referring now to FIGS. 2—10 of the drawings, a number of good and bad or deteriorating gap conditions are set forth as denoted by use of my EDM oscilloscope display apparatus. FIG. 2 illustrates a typical display which appears upon the screen 68 as a result of plotting gap voltage versus machining current. When the normalizing means 72 (FIG. 1) is utilized the height of the display (assuming that the machining current signal is applied to the vertical deflecting plated 60) remains substantially constant regardless of the particular machining current level selected. In FIG. 2 it will be seen that the display 90 includes, in this example, a horizontal trace 92 with a somewhat lopsided triangular trace 94 sitting on top of it. The left side 96 of the triangle 94 is the brighter portion of the trace and represents time spent in actual machining, i.e., in material removal. The right side 98 of the triangular trace 94 represents recovery time immediately following each and every machining pulse or gap discharge.

A bright trace at the right end of the horizontal line 92 (as viewed in the drawings) represents short circuits while a bright trace at the left end of the line 92 represents open circuits. For example, in FIG. 3 the right end of the line includes a relatively large and bright spot 100 which indicates the presence of intermittent short circuits. At the same time the left end of the horizontal trace 92 in FIG. 3 has become faint and somewhat foreshortened. The presence, however, of the machining triangle 94' in FIG. 3, although lighter than in FIG. 2, indicates that machining is progressing albeit deteriorating. Open and short circuits can be overcome by advancing and withdrawing the tool 24, respectively (arrow 31, FIG. 1).

Figure 4:
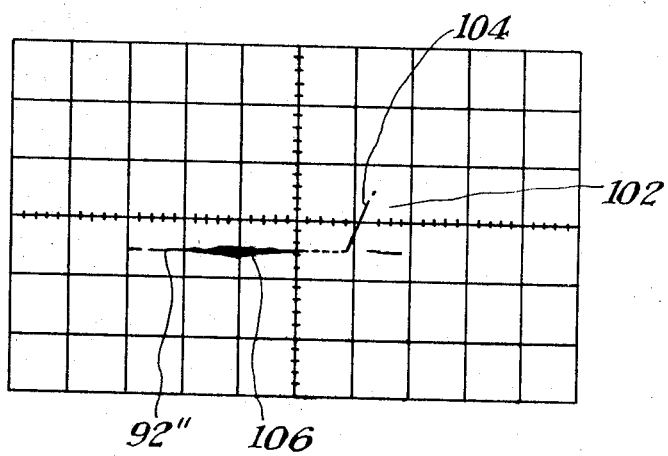
FIG. 4 is a similar display characterized by machining with improper flushing.
Figure 5:
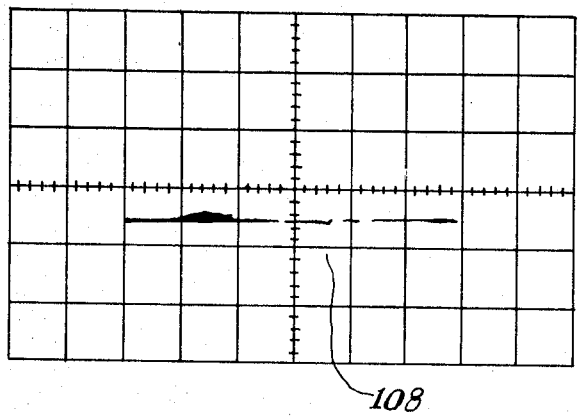
FIG. 5 is a similar display illustrating the cessation of the machining operation, as caused by debris accumulation or improper flushing.

On the other hand, the display 102 of FIG. 4 denoted a badly flushed machining gap, with some machining continuing. For instance, FIG. 4 shows a very light and partial trace 104 of the machining triangle but a very heavy trace 106 adjacent the midpoint of the horizontal trace 92'. The initial appearance of the bright horizontal trace portion 106 informs the operator of a bad flushing condition before damage to the workpiece or substantial loss of machining efficiency can occur. However, as shown in FIG. 5, if the bad flushing situation is not corrected, machining ceases as denoted by display 108. Here, the complete absence of the machining triangle informs the operator at a glance that no machining is taking place. The bad flushing condition can be corrected by opening valve 105 in tool conduit 107, of FIG. 1. The conduit 107 is connected in this example to a source (not shown) of dielectric fluid.

The displays 110, 112, 114, 116, 118 of FIGS. 6—10 respectively denote readily apparent display changes, which occur in both horizontal and vertical traces with the commencement of an arcing condition which thereafter deteriorates. In this particular example the progressive arcing situation is associated with the phenomenon known as "coking." Briefly, a localized heating of the workpiece apparently results in a progressive carbonization of a very limited area of the workpiece which results in an increasing concentration of the gap discharges at such area until sustained arcing occurs to terminate the machining operation.

Figure 6:
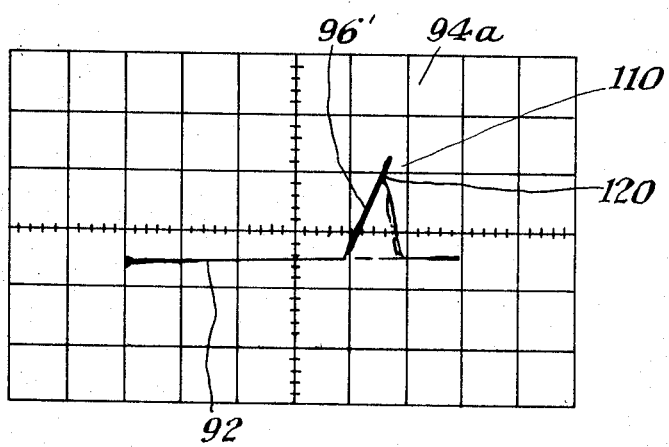
FIGS. 6—10 are oscilloscopic displays showing the progressive deterioration of the machining operation, as a result of the "coking" phenomenon.

The initial and very slight concentration of the gap discharges at the coking area is denoted by the display 110 of FIG. 6. The left or machining side 96' of the machining triangle 94a has just begun to project upwardly and beyond the vertex 120 of the machining triangle.

Figure 7:
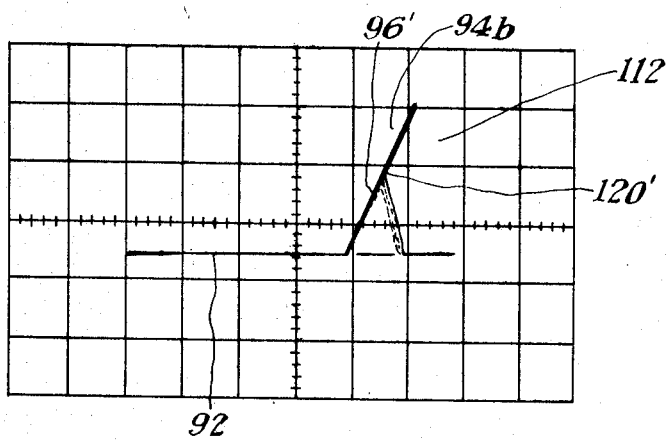
Figure 8:
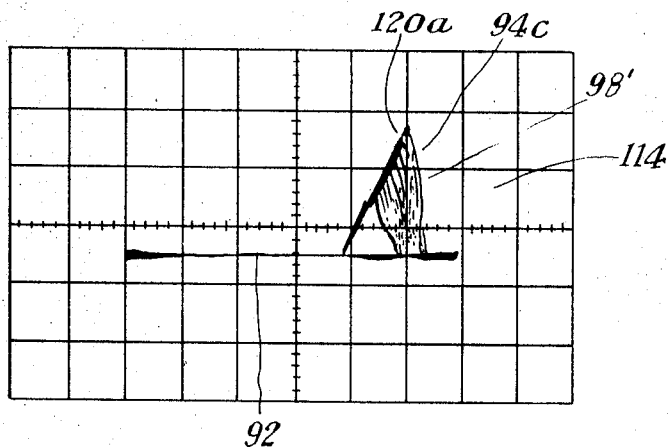
Figure 9:
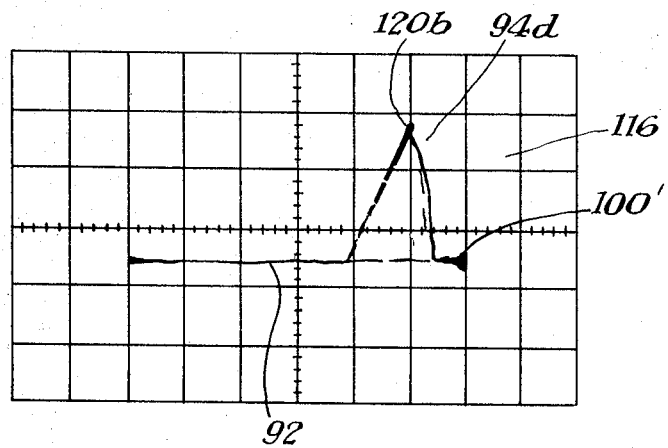
Figure 10:
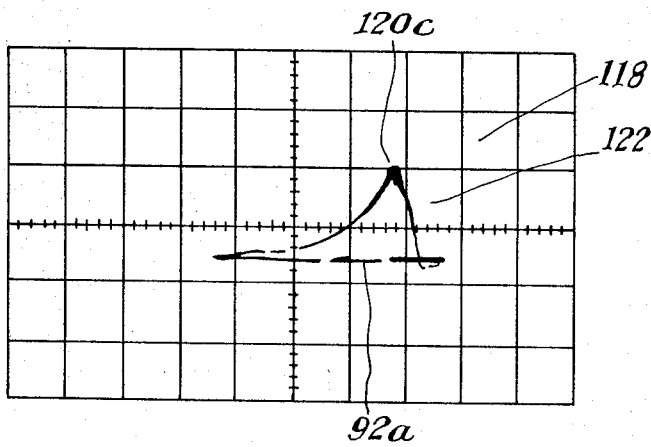

Further concentration of the gap discharges and attendant deterioration of the machining process is denoted by the machining triangle 94b of FIG. 7. In this case, the left side 96' of the machining triangle has progressed further beyond the apex 120' thereof. FIGS. 7, 8 and 9 show that as the coking condition worsens, the entire machining triangle, as denoted by triangles 94b, 94c, and 94d respectively, moves to the right, i.e., toward the short circuit end of the horizontal trace 92. Each of these changes is easily recognizable by the operator of the EDM apparatus. Other easily recognizable changes at this time are the fanning of the right side 98' of the machining triangle 94c (FIG. 8) and the upward movement of the vertex 120a and 120b (FIGS. 8 and 9) indicating increasing gap current.

The upward or downward movement of the vertex 120 indicates, of course, corresponding changes in the gap current within a given machining current level. Thus, in FIGS. 8 and 9 the gap current associated with the coking phenomenon is increasing as the terminal machining point is approached, but thereafter decreases slightly as shown by the location of vertex 120c in FIG. 10.

As the machining operation deteriorates toward its terminal condition, as shown in FIG. 9, the vertex 120b of the machining triangle 124d and the right or short circuit end 100' of the horizontal trace 92 become relatively brighter to denote clearly that most of the gap discharge is confined to the coking area. The display 118 of FIG. 10 on the other hand, denotes the terminal coking conditions of substantially 100 percent coking discharge or sustained arcing with no machining occurring. This is signified by foreshortening and interrupting of the horizontal trace 92a, while coking triangle 122 is slurred or extended substantially along the length of the horizontal trace.

In further accord with my invention the coking condition can be obviated at its onset (FIG. 6) by reducing the machining current duty cycle, as taught in copending, coassigned application entitled Power Supply and Adaptive Control System for EDM Apparatus, filed Sept. 16, 1968, Ser. No. 759,833. With my present arrangement, however, an operator can eliminate the coking condition (without the provision of specialized power supply circuitry) by manual adjustment of the pulse generator 38 to decrease the machining current duty cycle of the EDM apparatus 20 by decreasing the pulse on time of the pulse generator 38.

The aforedescribed changes in the display appearing on screen 68 (FIG. 1) and detailed in FIGS. 2—10 are obvious and readily apparent to a relatively untrained observer. With my normalizing means 72, these displays appear substantially the same for various machining pulse widths, widely varying duty cycles, and of course the machining current levels as denoted previously. The particular machining faults denoted by these displays appear substantially as shown irrespective of a particular set of machining parameters. On the other hand, any "normalizing" of a conventional voltage versus time oscilloscopic display is very difficult if not impossible to achieve.

As FIGS. 2—10 abundantly illustrate, a relatively untrained operator can quickly recognize even a very slight deterioration in gap conditions or in the machining process and make the necessary corrections or adjustments well in advance of any substantial loss in machining efficiency or workpiece damage.

It is also contemplated that the desired shape and position of the machining triangle 94 and the horizontal trace 92 for the normal or ideal machining conditions (such as shown in FIG. 2) can be printed or "calibrated," as it were, directly onto the outer surface of the screen 68 of the cathode-ray tube 54 to further aid the operator in elevating subsequent departures of the display from its ideal shape, as determined by the particular EDM apparatus with which the oscilloscope display 22 is used.

From the foregoing it will be apparent that novel and efficient forms of oscilloscope display for electric discharge machining apparatus and the like have been described herein. While I have shown and described certain presently preferred embodiments of the invention and have illustrated presently preferred methods of practicing the same, it is to be distinctly understood that the invention is not limited thereto, but may be otherwise variously embodied and practiced within the spirit and scope of the invention.

I claim:

1. Gap discharge apparatus comprising an electrode tool and workpiece spaced to form a discharge gap therebetween, a source of unidirectional potential, pulse generating means for generating a series of pulses, means for connecting said source and said pulse-generating means in series to said tool and said workpiece for inducing repetitive discharges across said gap, an oscilloscope having angularly disposed first and second deflecting means, said first deflecting means being connected to said tool and said workpiece in electrical parallel with said gap, and circuit means for coupling said second deflecting means in series with said source and one of said tool and said workpiece and in series with said gap.

2. The combination according to claim 1 wherein a current level circuit is coupled between said source and one of said tool and said workpiece for establishing a plurality of machining current levels across said gap when said gap discharges occur, and multipath normalizing circuit means are coupled between said second deflecting means and said coupling circuit means for normalizing the signal applied to said second deflecting means irrespective of machining current level.

3. The combination according to claim 2 wherein selector switch means are coupled to said current level circuit for selecting one of said machining current levels, and additional switch means are coupled to a plurality of impedance paths of said normalizing circuit means for selecting one of said paths in conformance to a selected one of said machining current levels, said additional switch means being mechanically coupled to said selector switch means for simultaneous actuation thereof.

4. The combination according to claim 1 wherein said coupling circuit means include a low impedance current shunt, and said second deflecting means are coupled across said shunt for developing a deflecting signal for said second deflecting means.

5. The combination according to claim 4 wherein said current shunt is a metallic plate having a resistivity about 10 times that of copper or less to minimize inductive coupling.

6. The combination according to claim 4 wherein amplifying means are coupled between said second deflecting means and said current shunt.

7. The combination according to claim 2 wherein said normalizing circuit means include a pair of multiple contact switches and differing impedance paths are coupled respectively between corresponding contacts of said switches said paths being in inverse ratio to said current levels.

8. The combination according to claim 7 wherein an additional contact of each of said switches are connected to a minimal impedance path therebetween to establish a normalizing base for said normalizing circuit means.

9. The combination according to claim 8 wherein additional multiple contact switch means are coupled to said current level circuit for selectively coupling one or more of said paths in series with said source and said gap, said rotary switches and said additional switch means being mechanically coupled together for simultaneous actuation.

10. The combination according to claim 7 wherein said impedance paths are formed by a stepped voltage-dividing network.

11. A method for monitoring and operating gap discharge machining apparatus and the like, said method comprising the steps of forming an electro-oscillograph by deflecting an oscilloscope electron beam in one plane over distances proportional to gap discharge machining current and in a plane at an angle to said first plane over distances proportional to machining gap voltage, and adjusting the machining parameters of said apparatus so that said oscillograph approximates a predetermined ideal shape for said apparatus.

12. The method according to claim 11 including the additional step of imprinting said ideal shape on an exterior surface of said screen.

13. The method according to claim 11 including the additional step of normalizing said oscillograph by inversely varying a signal corresponding to said machining current with respect to a selection of machining current levels.